March 7, 1950 — J. KONUPEK — 2,499,590
GRAIN HULLING MACHINE
Filed May 15, 1946 — 2 Sheets-Sheet 1

INVENTOR
JAN HRDLICKA, ADMINISTRATOR
OF THE ESTATE OF
JINDRICH KONUPECK, DECEASED
BY Robert E Burns
ATTORNEY Patented Mar. 7, 1950

2,499,590

UNITED STATES PATENT OFFICE 2,499,590

GRAIN HULLING MACHINE

Jindřich Konupek, deceased, late of Melnik, Czechoslovakia, by Jan Hrdlička, administrator, Melnik, Czechoslovakia, assignor to Vaclav Jindrich, Melnik, Czechoslovakia Application May 15, 1946, Serial No. 669,900
In Czechoslovakia January 18, 1939

1 Claim. (Cl. 146—279)

The present invention relates to improvements in grain peeling machines.

The usual horizontal or vertical peeling machines which are fed by a continuous flow of grain, consist substantially of a drum, the interior of which is lined by a layer of rough stone except for a portion of wire meshing or perforated sheet-metal piece for the passage of air which serves to draw away the peeled particles. Mounted in the axis of the drum is a shaft, carrying several impeller blades arranged in the formation of a star or the like, said blades being preferably inclined towards the axis of the drum. The impeller blades project the grain against the rough lining of the machine the grain being thus peeled and simultaneously transported from the entrance to the exit of the machine. In some designs of peeling machines a modification of the previously known grating machines has been suggested, wherein the grain is grated between two rough surfaces, for instance a perforated jacket and an eccentrically mounted grating or grinding cylinder of which either one is stationary and the other movable or both revolve either in the same or in the opposite direction, preferably with different velocities. The output of these machines is unsatisfactory and, moreover, they are highly uneconomic. They require an expert and extremely careful handling and further the temperature of the grain rises excessively in consequence of the high working pressure. Large grains are broken or wasted by excessive grinding, whereas small grains pass through, without being peeled at all.

The present invention relates to a peeling machine, which can be used in a number of ways for the widest varieties of products, such as grain, rice, peas, soya beans, beet- and cotton-seed etc. where each grain is treated in the desired way, uniformly on its whole surface without any breaking of grains, while reducing the driving power to a minimum.

The peeling machine, to which the invention relates, comprises a working space formed by a horizontal grinding cylinder rotating with great velocity and by a perforated or wire-mesh jacket, which rotates slowly in the opposite direction and is provided in its interior with helical ribs similar to the impeller blades. According to the invention the grinding cylinder is composed of a number of discs faced by grinding material and, together with the jacket, mounted co-axially on a common shaft, on which the particular lined discs are rigidly mounted or keyed on next to each other, two discs being mounted freely on the shaft for movement in opposite direction, and connected at their circumference by a plurality of carriers for removable and/or interchangeable cylindrical sectors of the jacket.

According to a further feature of the invention the peeling mechanism of the machine is airtightly enclosed in a casing, which is attached to a central air conduit or to a blower a valve being arranged in a suitable point in the casing, in order to control the admission of secondary air.

The invention will now be described in detail on a typical example, reference being made to the accompanying drawings in which.

Figure 1:
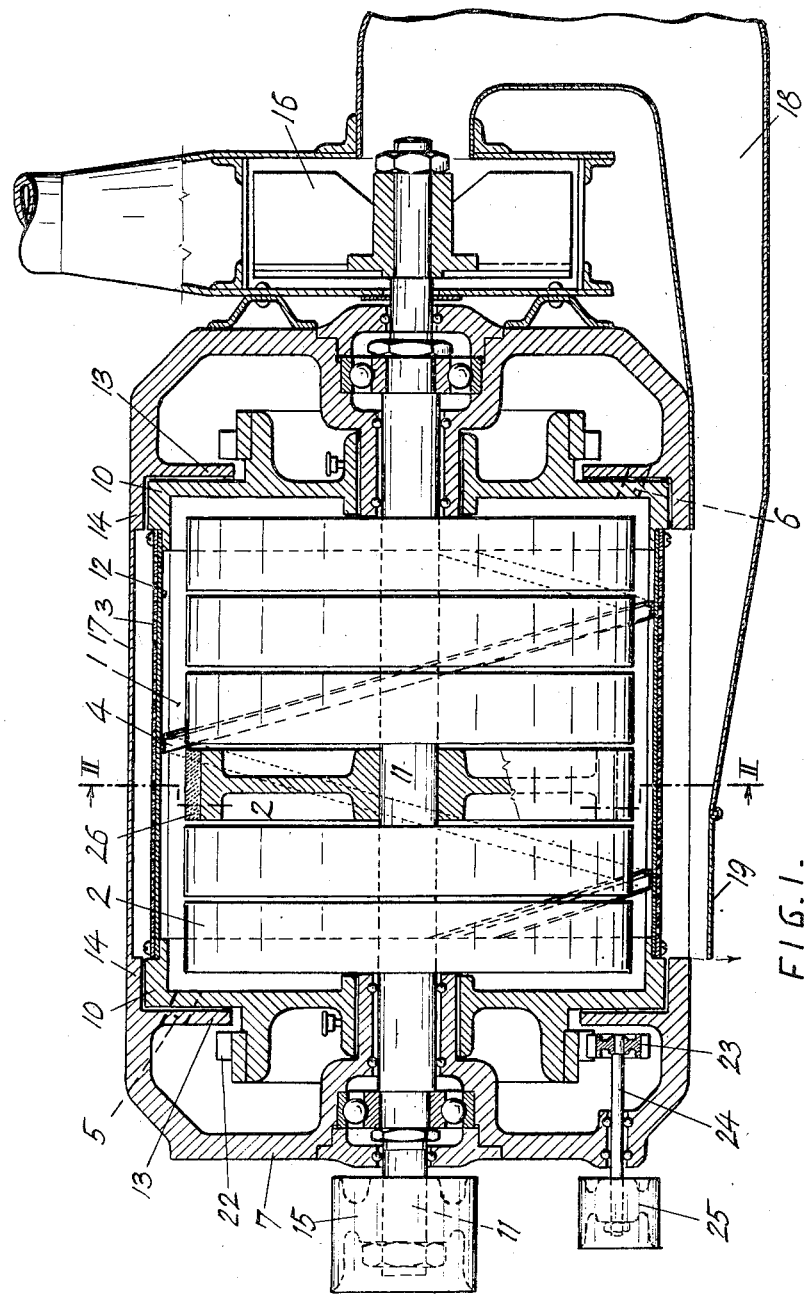
Fig. 1 is a longitudinal sectional view of the peeling or husking machine.
Figure 2:
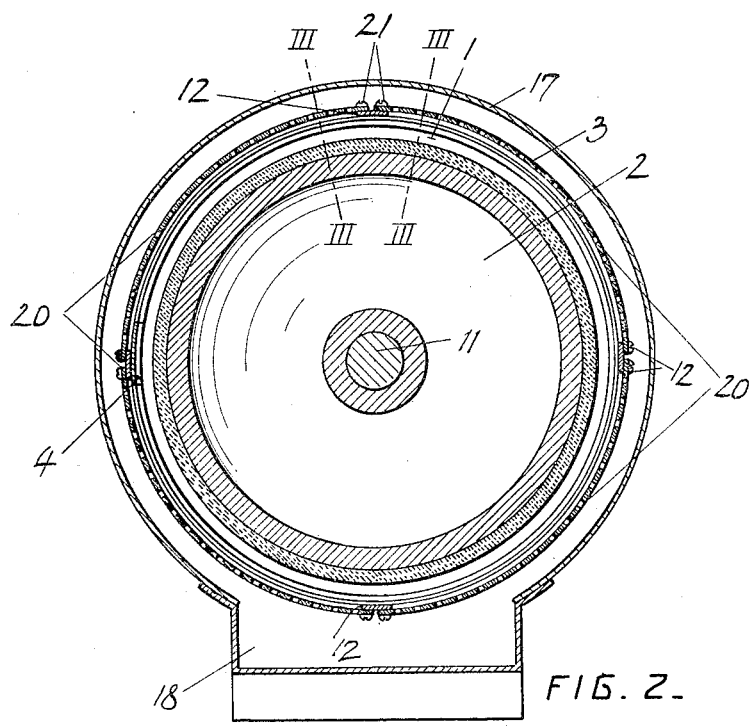
Fig. 2 is a cross-sectional view taken along the line II—II of Fig. 1.
Figure 3:
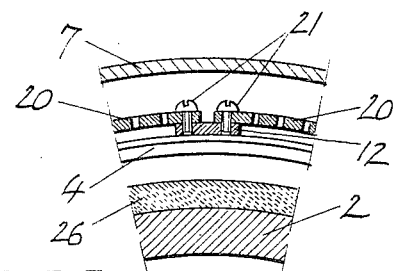
Fig. 3 is an enlarged fragmentary view of the portion of Fig. 2 between the lines III—III.

The working space 1 of the peeling machine is formed by a horizontal grinding cylinder 2, rotating with a great velocity within a perforated or wire-mesh jacket 3 revolving with a low velocity in the opposite direction. The interior of the jacket 3 is provided with helical ribs 4, which, in a way similar to impeller blades, project the grain against the rough surface of the cylinder 2, entrain it around the latter and convey it from the entrance 5 to the exit 6.

The grinding cylinder 2 according to the invention is composed of a plurality of discs faced on their circumferences by grinding surfaces 26 and mounted on a shaft 11 of the machine. The jacket 3 is mounted co-axially with regard to the cylinder 2. The particular lined discs are rigidly mounted or keyed on to the shaft 11. At both sides of the cylinder 2 two discs or flanges 10 are freely mounted for movement in opposite directions and connected at their circumference by a plurality of carriers 12. The gaps between the carriers are covered by perforated or wire mesh sectors, which together form the jacket 3. The sectors are preferably arranged for easy interchange or replacement. The frame 7 of the machine is provided with flanges 13, at each side for axially guiding the jacket and also with rings 14, for stabilizing the latter in radial direction. The shaft 11 also carries on opposite ends a driving pulley 15 and a blower 16.

The flange 10 is provided with teeth 22 meshing with a pinion 23, mounted on a shaft 24, which carries another pulley 25, to which rotational movement is imparted in the desired direction and with the required velocity in order to obtain rotating movement of the flanges 10 and jacket 3.

The peeling mechanism is enclosed in an air tight casing 17, which is attached to a central air conduit or the conduit 18 having its own blower 16. The air current is preferably of a volume and pressure so as to sufficiently cool the peeled grain and ensure a reliable withdrawal of the waste material, which is sifted through the perforated jacket 3 into the casing 17 of the machine. The force of the air current enables the control of the velocity of the passage of the grain through the machine or the extent of its peeling. For this purpose a valve 19 is arranged at a suitable point in the casing 17, said valve allowing secondary air to enter the air conduit 18. By opening the valve 19 the entraining force of the air current in the peeling machine is reduced and the passage of the less peeled grain accelerated. On the other hand, by closing the valve the power of the air current is increased, the passage of the grain retarded and the extent of its peeling increased. By the employment of the peeling machine according to the invention it is possible to peel in one passage from 5 to 20% or more of the grain, so that the whole skin, or pericarp, the aleuron layer and the seed-bud are removed, but the grain remains whole. The flour endosperm is thus stripped of layers which have not the desired caloric value. The grain peeled in this way can easily be further ground into flour in one operation by a cutting or breaking machine and pressing cylinders and by about two passages through a cylinder mill. For the second milling operation there remains only a small quantity of coarse grain which is sifted out by the sifting mechanism.

The peeling machines heretofore known remove approximately 3% of the tips of grain and superficial impurities, whereas the entire contents of bran is continuously ground between the cylinders. This operation is repeated seven to eleven times, until only the bran remains. Owing to the continuous milling and breaking of the bran the milling operation lasts too long and the flour is neither clean nor clear, because the fine grey particles of the bran penetrate into the flour. The milling operation, known up to now, yields therefore first the flour and lastly the bran. In contradistinction to that by using the peeling machine according to the invention, it is possible to separate first the bran to prevent it from impairing the purity of the flour so that in the further stages of the milling process clear, hygienic, clean and easily digestible flour is obtained.

What is claimed is:

In a machine for removing the husks of grain, a horizontal rotatable shaft supporting means for the shaft, a plurality of spaced disc members carried by the shaft for rotation therewith, each disc member having a cylindrical grinding surface on its circumference, a rotatable, horizontal, perforate, cylindrical member surrounding said discs with its peripheral wall slightly spaced from the peripheries of the discs, said cylindrical member having a grain inlet opening at one end and a grain outlet opening at the opposite end, a continuous helical rib positioned on the inner surface of the peripheral wall of said cylindrical member and arranged in the direction to aid passage of grain through the machine, supporting means for the cylindrical member, means to rotate the shaft and discs in one direction at high speed, means to rotate the cylindrical member in the opposite direction at a much lower speed, a substantially airtight cylindrical casing closely surrounding the perforated portion of the cylindrical member, an exhaust fan on said shaft at the end opposite the grain inlet end of the cylinder, a passageway connecting said casing with the intake of the exhaust fan and adjustable air inlet means for admitting air from the atmosphere to said casing at the end adjacent the grain inlet end of the cylindrical member whereby the rate of passage of grain through the cylindrical member and the degree of action on the grain is controlled by varying the air admitted by said adjustable inlet.

JAN HRDLICKA,
*Administrator of the Estate of Jindřich Konůpek, Deceased.*

REFERENCES CITED

The following references are of record in the file of this patent:

UNITED STATES PATENTS

| Number | Name | Date |
| --- | --- | --- |
| 87,441 | Springer | Mar. 2, 1869 |
| 102,764 | Buchholz | May 10, 1870 |
| 377,920 | Welch | Feb. 14, 1888 |
| 1,044,924 | Scott | Nov. 19, 1912 |

FOREIGN PATENTS

| Number | Country | Date |
| --- | --- | --- |
| 211,854 | Germany | July 22, 1909 |